(12) United States Patent
Stanley

(10) Patent No.: US 7,900,413 B2
(45) Date of Patent: Mar. 8, 2011

(54) METHOD OF SECURING FLEXIBLE SOLAR PANEL TO PVC ROOFING MEMBRANE

(76) Inventor: Joel Stanley, Colleyville, TX (US)

( * ) Notice: Subject to any disclaimer, the term of this patent is extended or adjusted under 35 U.S.C. 154(b) by 0 days.

(21) Appl. No.: 12/386,786

(22) Filed: Apr. 22, 2009

(65) Prior Publication Data

US 2010/0269882 A1    Oct. 28, 2010

(51) Int. Cl.
*E04D 13/08* (2006.01)
*E04B 5/00* (2006.01)

(52) U.S. Cl. .............. 52/408; 52/173.3; 52/411; 52/409

(58) Field of Classification Search ............ 52/408, 52/411, 409, 173.3, 302.1, 302.3, 406.1, 52/407.5; 136/246
See application file for complete search history.

(56) References Cited

U.S. PATENT DOCUMENTS

| | | | | | |
|---|---|---|---|---|---|
| 4,358,499 | A | * | 11/1982 | Hill | 428/220 |
| 5,215,598 | A | * | 6/1993 | Kouzuma et al. | 136/251 |
| 5,800,631 | A | * | 9/1998 | Yamada et al. | 136/251 |
| 6,380,477 | B1 | * | 4/2002 | Curtin | 136/244 |
| 6,729,081 | B2 | | 5/2004 | Nath et al. | |
| 7,531,740 | B2 | * | 5/2009 | Flaherty et al. | 136/244 |
| 7,557,291 | B2 | * | 7/2009 | Flaherty et al. | 136/244 |
| 7,635,810 | B2 | * | 12/2009 | Luch | 136/256 |
| 7,641,964 | B2 | * | 1/2010 | Swei et al. | 428/215 |
| 7,678,991 | B2 | * | 3/2010 | McCaskill et al. | 136/244 |
| 7,732,243 | B2 | * | 6/2010 | Luch | 438/57 |
| 7,810,286 | B2 | * | 10/2010 | Eiffert et al. | 52/173.3 |
| 2006/0172643 | A1 | * | 8/2006 | Greaves et al. | 442/136 |
| 2007/0224414 | A1 | * | 9/2007 | Leonard et al. | 428/339 |
| 2009/0288359 | A1 | * | 11/2009 | Martin et al. | 52/309.1 |
| 2010/0242381 | A1 | * | 9/2010 | Jenkins | 52/173.3 |

* cited by examiner

*Primary Examiner* — Richard E Chilcot, Jr.
*Assistant Examiner* — Mark R Wendell
(74) *Attorney, Agent, or Firm* — James E. Walton; Richard G. Eldredge

(57) ABSTRACT

There is disclosed a method of adhering a flexible solar panel to a PVC-based roofing membrane that interposes a certain plasticizer-containing PVC membrane between the solar panel and the roofing membrane.

12 Claims, 1 Drawing Sheet

METHOD OF SECURING FLEXIBLE SOLAR PANEL TO PVC ROOFING MEMBRANE

BACKGROUND OF THE INVENTION

The use of polyvinyl chloride (PVC)-based membranes as a commercial roofing material has come into widespread application in the roofing industry inasmuch as the material is flexible, waterproof and may be rapidly applied over a large area as new roofing, re-roofing or over existing roofing by a wide variety of methods, including mechanical attachment or gluing, with adjacent panels being joined by seams formed by heat-welding or solvent-welding. Such PVC-based roofing membranes typically comprise a three-ply composite of a layer of a polyester, e.g., polyethylene terephthalate (PET) or fiberglass fabric reinforcement sandwiched between two PVC films, the overall composite typically being 30 to 90 mils thick.

In the late 1990's waterproof flexible photovoltaic solar panels were developed that could be secured to roofing materials, including the aforesaid composite reinforced PVC membranes, thereby permitting the passive generation of electrical energy from rooftops by exposure to the sun, in essence giving roofs a dual utility of conventional protection from the elements and the generation of power.

A fundamental problem with securing such flexible photovoltaic solar panels to PVC roofing membranes lies in the incompatibility between (1) the adhesive typically used to glue the solar panels to the roofing membranes and (2) the conventional plasticizers used in PVC roofing membranes. More specifically, the PVC in the PVC roofing membrane contains certain plasticizers to enhance the membrane's flexibility, and the most widely used adhesive is a butyl rubber-containing asphalt adhesive either applied to the back side of the solar panels or in the form of two-sided tape. Over a period of two to four years the conventional plasticizers in the PVC layers of the reinforced PVC roofing membrane migrate from the PVC into the butyl rubber-containing asphalt adhesive, which softens the adhesive bond and compromises the elasticity of the PVC layer of the roofing membrane, which in turn weakens and/or destroys the bond between the solar panel and the roofing membrane and seriously compromises the flexibility that allows for expansion and contraction of both the PVC roofing membrane and the flexible solar panel. Although other classes of adhesives have been investigated for securing such solar panels to such PVC roofing membranes, they have more drawbacks than such a butyl-based adhesive. For example, acrylics lack sufficient bond flexibility as soon as they have been applied and are costly, while ethylene vinyl acetate hot melts require special dedicated factory equipment and narrow temperature ranges, making them essentially useless on a job site.

Accordingly, there is a need in the art for a method of securing conventional flexible solar panels to PVC roofing membranes that provides a strong, elastic, long-lasting bond between the two. This need is met by the present invention, which is summarized and described in detail below.

SUMMARY OF THE INVENTION

According to the present invention there is provided a method of installing a photovoltaic solar panel on a roof comprising the steps:
(a) securing a PVC membrane to a roofing support;
(b) securing a plasticizer-containing PVC membrane to the PVC membrane of step (a); and
(c) securing a flexible photovoltaic solar panel membrane to the plasticizer-containing PVC membrane of step (b) wherein the plasticizer-containing PVC membrane contains PVC-compatible, butyl-resistant plasticizers, and optional additives such as antioxidants, flame retardants, stabilizers, colorants and other conventional additives known in the art.

DETAILED DESCRIPTION OF PREFERRED EMBODIMENTS

Figure 1:
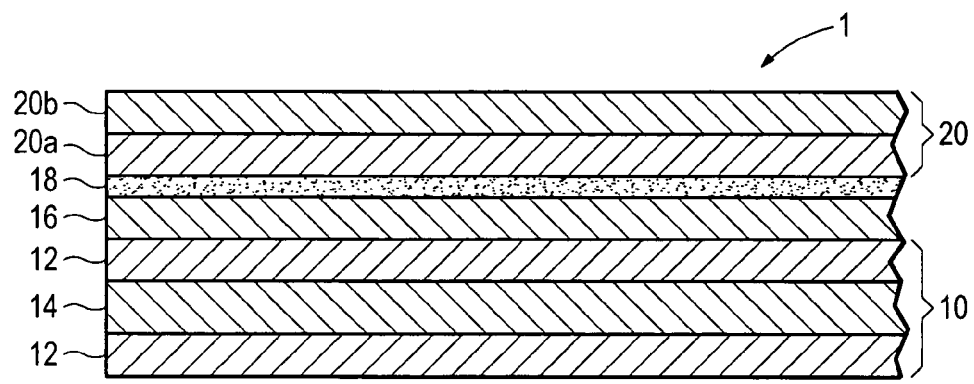
FIG. 1 is a cross-sectional view of an exemplary roof assembly of the invention that includes a flexible photovoltaic solar panel.
Figure 2:
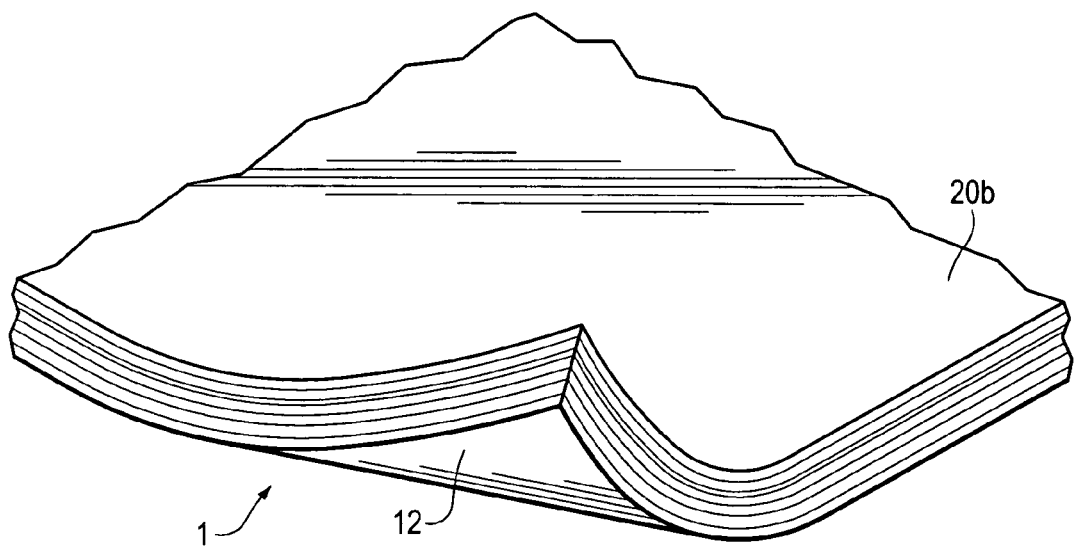
FIG. 2 is a perspective view of the roof assembly of FIG. 1 with elements of the assembly turned up on one corner.

Referring to the drawings, wherein the same numerals refer to the same elements, there is shown in FIGS. 1-2 a roof assembly 1 comprising a polymeric roofing membrane 10, typically consisting of two PVC layers 12 with a polyester or fiberglass reinforcement layer 14 interposed between the two PVC layers. Roofing membrane 10 may be secured in conventional fashion to a roof deck of virtually any construction, including frames or flat or curved surfaces of any material, including preexisting roofing or roofing membranes.

A second element of the roofing assembly is a plasticizer-containing PVC membrane 16 containing PVC-compatible, butyl-resistant plasticizers and optional antioxidants, flame retardants, stabilizers, colorants and other conventional additives known in the art. Exemplary such additives are phenolic antioxidants, antimony oxide and calcium carbonate as flame retardants and minor amounts of cadmium, barium and/or zinc as stabilizers. By "PVC-compatible and butyl-resistant" plasticizers is generally meant plasticizers that do not degrade PVC and that resist or minimize migration from PVC into butyl-based adhesives. Exemplary classes of such plasticizers include polyester-based plasticizers, such as phthalate-based esters, nitrile butyl rubbers, ketone/ethylene ester terpolymers (commercially available form DuPont as ELVALOY® and known polymeric plasticizers. Such a membrane 16 is commercially available as Asphalt-Resistant Vinyl Copolymer/Fabric Laminate from Canadian General Tower, Ltd. of Cambridge, Ontatrio. Membrane 16 may be secured to roofing membrane 10 by conventional heat-welding, solvent-welding or gluing. Heat-welding may be conducted by a heated platen, by the use of a hot air gun or by a dielectric welder. Solvent-welding may be conducted by applying a solvent in which PVC is soluble to roofing membrane 10 or to plasticizer-containing PVC membrane 16 or to both, followed by joining the two membranes; preferred solvents are tetrahydrofuran (THF) and methyl ethyl ketone (MEK). Gluing is preferably conducted by applying an ethylene/propylene copolymer-based adhesive to both membrane 10 and membrane 16, then joining the two; a preferred adhesive of this type is an epoxy resin-based contact adhesive such as IB Vertibond from IB Roof Systems of Eugene, Oreg.; Sarnacol 2170 from Sika Canada, Inc.; or Pliobond 1746 from Bio-Rad Laboratories, Inc.

The third and final element of the roofing assembly is a flexible photovoltaic solar panel 20, typically comprising a flexible substrate 20a to which is adhered a solar module 20b. Such panels are commercially available pre-assembled, typically with amorphous silicon photovoltaic cells encased within flexible, water-tight and transparent industrial fabrics and/or polymeric membranes and optionally including output cables and by-pass diodes. Suitable such solar panels 20 are the IB SolarWise 272 Watt and 544 Watt panels available from IB Roof Systems, Inc. of Eugene, Oreg. and the UNI-SOLAR® PVL 68 Watt and 544 Watt panels from United Solar Systems Corporation of Auburn Hills, Mich. Solar panel 20 is preferably glued to membrane 16 by a water-resistant contact adhesive such as a butyl rubber-containing asphalt adhesive or an ethylene/propylene copolymer adhesive containing butyl rubber, the latter being commercially available as a two-sided tape sold as SIKALASTOMER®-68 by Sika Corporation of Madison Heights, Mich. Butyl rubber-containing asphalt adhesives, commonly referred to as "rubberized asphalts," typically comprise 40-60 wt % asphalt, 10-20 wt % of a rubber such as a styrene/butadiene block copolymer and up to 10 wt % of a plasticizer. Application of such an adhesive forms contact adhesive layer 18 between solar panel 20 and membrane 16. In securing solar panel 20 to membrane 16, it is preferred to leave suitable-sized longitudinal gaps, on the order of 2 cm wide, in the bond between solar panel 20 and membrane 16, said gaps being in communication with the atmosphere, so as to permit the release of water vapor and gases and thereby help prevent delamination and maintain flexibility between panel 20 and membrane 16 upon expansion and contraction of the two.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A method of installing a photovoltaic solar panel on a roof comprising the steps:
    (a) securing a polyvinyl chloride (PVC) roofing membrane to a roof deck;
    (b) securing a PVC-compatible membrane to said PVC roofing membrane of step (a);
        applying an adhesive membrane to the PVC-compatible membrane;
    (c) securing a flexible photovoltaic solar panel membrane to said adhesive membrane; and
        minimizing the migration of a PVC plasticizer from the PVC roofing membrane to the adhesive membrane by adding a butyl-resistant plasticizer to the PVC-compatible membrane.

2. The method of claim 1 wherein step (b) is conducted by a method selected from the group consisting of heat-welding, dielectric-welding, solvent-welding and gluing.

3. The method of claim 2 wherein said heat-welding is conducted by the application of hot air; said solvent-welding is conducted by applying a solvent to said PVC roofing membrane and to said PVC-compatible, said solvent being selected from the group consisting of tetrahydrofuran and methyl ethyl ketone; and said gluing is conducted by applying an epoxy resin-based contact adhesive to said PVC membrane and to said PVC-compatible membrane.

4. The method of claim 3 wherein step (c) is conducted by gluing with a water-resistant contact adhesive.

5. The method of claim 4 wherein said contact adhesive is selected from rubberized asphalt adhesives and an ethylene/propylene copolymer containing rubber.

6. The product of the method of claim 1.

7. A composite article comprising:
    (a) a fabric-reinforced polyvinyl chloride (PVC) roofing membrane;
    (b) a PVC-compatible membrane;
        an adhesive membrane applied to the PVC-compatible membrane; and
    (c) a flexible photovoltaic solar panel membrane
    wherein said PVC-compatible membrane contains at least one butyl-resistant plasticizer selected from the group consisting of ketone/ethylene ester terpolymers and nitrile rubbers; and
    wherein the PVC-compatible membrane minimizes the migration of a PVC plasticizer from the PVC roofing membrane to the adhesive membrane.

8. The article of claim 7 wherein said PVC-compatible membrane includes additives selected from the group consisting of antioxidants, flame retardants, stabilizers, colorants and mixtures thereof.

9. The article of claim 7 wherein the fabric of said fabric-reinforced PVC membrane is selected from a polyester and fiberglass.

10. A composite article comprising:
    a fabric-reinforced polyvinyl chloride (PVC) roofing membrane containing a plasticizer;
    a photovoltaic solar panel;
    an adhesive membrane attached to the solar panel; and
    a PVC-compatible membrane disposed between the adhesive membrane and the PVC roofing membrane;
    wherein the plasticizer-resistant membrane reduces the migration of the plasticizer from the PVC roofing membrane to the adhesive membrane.

11. The article of claim 10 wherein the PVC-compatible membrane includes additives selected from the group consisting of antioxidants, flame retardants, stabilizers, colorants and mixtures thereof.

12. The article of claim 10 wherein the fabric of said fabric-reinforced PVC membrane is selected from a polyester and fiberglass.

* * * * *